United States Patent
Lu et al.

(10) Patent No.: US 10,386,939 B2
(45) Date of Patent: Aug. 20, 2019

(54) MOUSE

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Yi-Shun Chen, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/697,548

(22) Filed: Sep. 7, 2017

(65) Prior Publication Data
US 2019/0073047 A1   Mar. 7, 2019

(51) Int. Cl.
*G06F 3/0354*  (2013.01)
*G06F 3/03*  (2006.01)

(52) U.S. Cl.
CPC .......... *G06F 3/0354* (2013.01); *G06F 3/0317* (2013.01); *G06F 3/03543* (2013.01); *G06F 2203/0333* (2013.01)

(58) Field of Classification Search
CPC ............... G06F 3/03543; G06F 3/0317; G06F 2203/0333; G06F 3/0383; G06F 3/0354
See application file for complete search history.

(56) References Cited

U.S. PATENT DOCUMENTS

| | | | | |
|---|---|---|---|---|
| 5,828,364 A * | 10/1998 | Siddiqui | ............... | G06F 3/0312 345/163 |
| 6,459,421 B1 * | 10/2002 | Cho | ...................... | G06F 1/1616 345/163 |
| 6,522,321 B1 * | 2/2003 | Chen | ................... | G06F 3/03543 345/156 |
| 7,296,366 B2 * | 11/2007 | Lin | ........................ | B25B 15/00 33/760 |
| 8,094,449 B2 * | 1/2012 | Wang | ..................... | G06F 3/039 206/451 |
| 8,294,671 B1 * | 10/2012 | Hargreaves | ........... | G06F 3/0334 345/157 |
| 8,330,719 B2 * | 12/2012 | Lee | ........................ | G06F 3/0362 345/157 |
| 2004/0084341 A1 * | 5/2004 | Amtenbrink | ........... | B25H 3/003 206/372 |
| 2004/0130531 A1 * | 7/2004 | Cheng | ................... | G06F 3/0317 345/163 |
| 2006/0267754 A1 * | 11/2006 | Takeda | ............... | G05B 23/0264 340/506 |

(Continued)

FOREIGN PATENT DOCUMENTS

CN              2735450 Y     10/2005

*Primary Examiner* — Jose R Soto Lopez
(74) *Attorney, Agent, or Firm* — Li & Cai Intellectual Property (USA) Office

(57) ABSTRACT

A mouse includes a housing, a circuit board, at least one switch holder and at least one switch accommodating space. The housing of the mouse has at least one button. The circuit board is configured in the housing of the mouse. The switch holder supports the switch module, and the switch module and the switch holder are accommodated within the switch accommodating space. The housing of the mouse also has a gripper accommodating space, and a gripper is accommodated in the gripper accommodating space.

7 Claims, 9 Drawing Sheets

(56) References Cited

U.S. PATENT DOCUMENTS

| | | | | |
|---|---|---|---|---|
| 2006/0267942 | A1* | 11/2006 | Chen | G06F 1/3215 345/163 |
| 2007/0132733 | A1* | 6/2007 | Ram | G06F 3/0227 345/163 |
| 2008/0017538 | A1* | 1/2008 | Morchio | B42F 13/0026 206/451 |
| 2009/0026210 | A1* | 1/2009 | Chan | A45C 11/16 220/529 |
| 2010/0315342 | A1* | 12/2010 | Akatsuka | G06F 3/03543 345/163 |
| 2011/0069008 | A1* | 3/2011 | Kao | G06F 3/03543 345/163 |
| 2011/0221676 | A1* | 9/2011 | Liu | G06F 3/0317 345/166 |
| 2012/0032907 | A1* | 2/2012 | Koizumi | G06F 3/0414 345/173 |
| 2012/0176318 | A1* | 7/2012 | Huang | G06F 3/03543 345/163 |
| 2012/0256827 | A1* | 10/2012 | Ahn | G06F 1/169 345/157 |
| 2012/0319955 | A1* | 12/2012 | Kim | G06F 3/03543 345/163 |
| 2013/0120263 | A1* | 5/2013 | Liu | G06F 3/03543 345/163 |
| 2014/0099834 | A1* | 4/2014 | Lin | H01R 31/065 439/676 |
| 2014/0215105 | A1* | 7/2014 | Chang | G06F 3/0317 710/62 |
| 2015/0024780 | A1* | 1/2015 | Hong | H04W 4/029 455/456.2 |
| 2015/0228419 | A1* | 8/2015 | Fadell | G08B 17/00 307/112 |
| 2018/0136728 | A1* | 5/2018 | Unnikrishnan | G06F 3/016 |

* cited by examiner

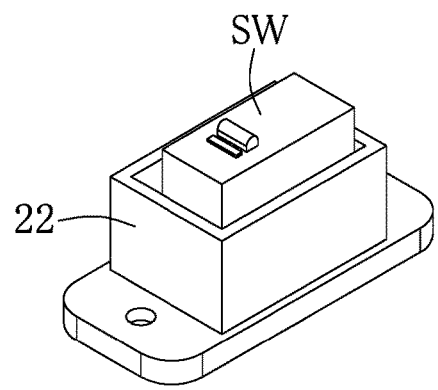
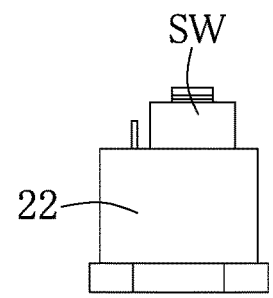
FIG. 3A  FIG. 3B
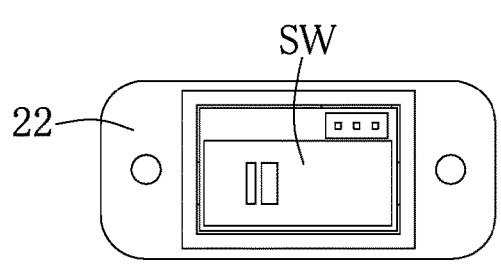
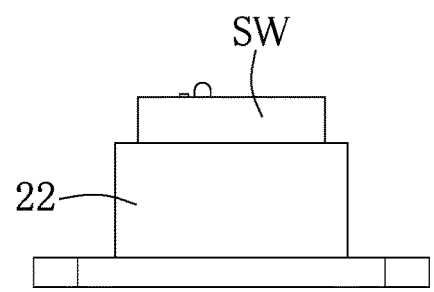
FIG. 3C  FIG. 3D

MOUSE

BACKGROUND OF THE INVENTION

1. Field of the Invention

The present disclosure relates to a mouse; in particular, to a mouse of which the micro switches can be easily exchanged by a user.

2. Description of Related Art

Keyboards and mice are the most commonly used input devices of a computer device. Generally, a mouse has a left button, a right button and a scroll wheel between the left button and the right button. The mouse is an essential device for many kinds of computer games. Some computer games are popular, and many players like to livestream games which they are playing over the Internet. Some players who possess superb gameplay mechanics or strategy would become professional game players.

When playing the games, the mouse buttons may be clicked hundreds of times throughout the span of just one game such that the mouse buttons may be overused and thus have their sensitivity decreased. How the player feels when pressing the mouse button (or how sensitive the mouse button is) depends on the micro switch of the mouse, so the player can exchange the micro switch based on his needs. However, the micro switch is configured in the mouse so it is not easy for players to exchange the micro switch with bare hands.

SUMMARY OF THE INVENTION

The present disclosure provides a mouse including a housing, a circuit board, at least one switch holder and at least one switch accommodating space. The housing of the mouse has at least one button. The circuit board is configured in the housing of the mouse. The switch holder supports the switch module, and the switch module and the switch holder are accommodated within the switch accommodating space. The housing of the mouse also has a gripper accommodating space, and a gripper is accommodated in the gripper accommodating space. A user can easily unload the switch holder and the switch module by using the gripper for changing the switch module.

In one of the embodiments provided by the present disclosure, the housing has a slot at the bottom of the housing. The shape of the slot corresponds to the shape of the bottom of the switch holder. The switch holder is locked at the bottom of the housing by using at least one screwing member when the switch holder is put into the slot to be accommodated by the switch accommodating space. In addition, two sides of the slot at the bottom of the housing respectively have a through hole. When it is necessary to exchange the switch module, the user can unload the switch holder and the switch module by making the gripping end of the gripper received by the through holes and then by using the gripping end of the gripper to clamp the switch holder.

In one of the embodiments provided by the present disclosure, the mouse further includes a sensor holder and a sensor accommodating space. The sensor holder supports a sensor, and the sensor and the sensor holder are accommodated in the sensor accommodating space. In this embodiment, the housing of the mouse has another slot at the bottom of the housing. The shape of the slot corresponds to the shape of the bottom of the sensor holder. The sensor holder is locked at the bottom of the housing by using at least one screwing member when the sensor holder is put into the slot to be accommodated by the sensor accommodating space. In addition, two sides of the slot at the bottom of the housing respectively have another through hole. When it is necessary to exchange the sensor, the user can unload the sensor holder and the sensor by making the gripping end of the gripper received by the through holes and then by using the gripping end of the gripper to clamp the sensor holder.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIGS. 3A~3D show two top views and two side views of a switch holder supporting a switch module according to one embodiment of the present disclosure.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 1A:
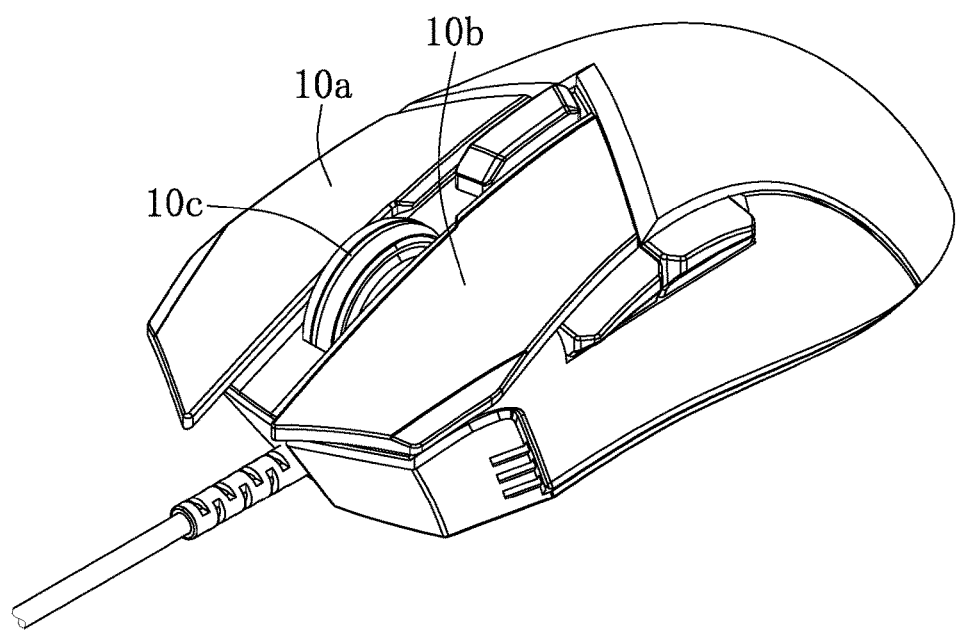
FIGS. 1A~1B show schematic diagrams of a mouse according to one embodiment of the present disclosure.
Figure 1B:
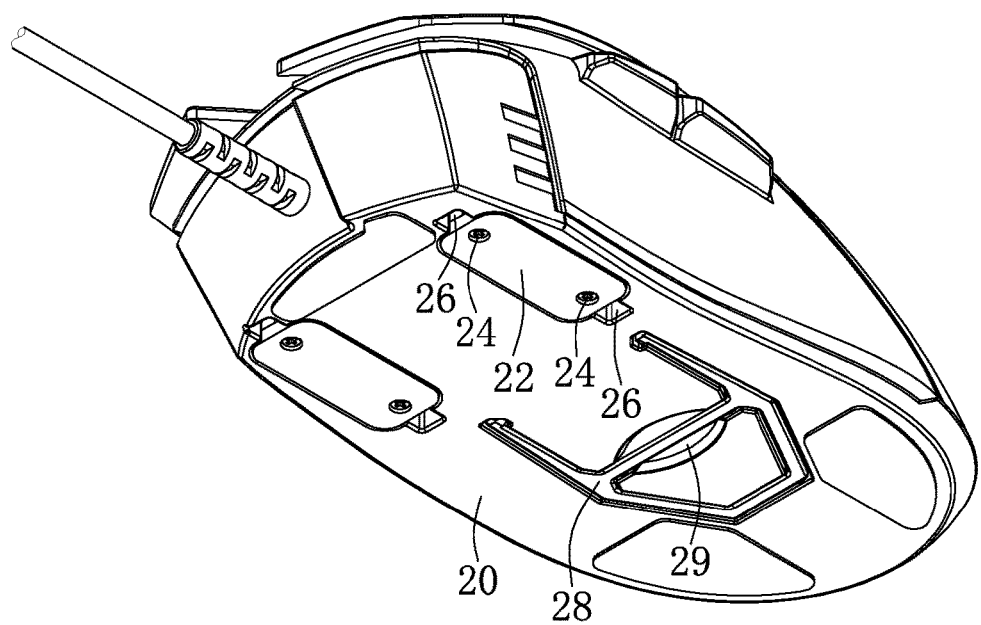

FIGS. 1A~1B show schematic diagrams of a mouse according to one embodiment of the present disclosure. As shown in FIG. 1A, the mouse has a housing. For ease of illustration, in the following description, the housing of the mouse is divided into two parts, an upper housing 10 and a lower housing 20. At least one button is configured on the upper housing 10 of the mouse. For example, the mouse provided by this embodiment has three buttons 10a~10c. The buttons 10a~10c can be the right button, the left button and the scroll wheel, but it is not limited thereto. A circuit board is configured inside the housing of the mouse to control the entire operation of the mouse. The details about how the operation of the mouse is controlled by the circuit board should be easily understood by those skilled in the art, and thus the redundant information is not repeated.

As shown in FIG. 1B, in addition to the upper housing 10, the mouse has the lower housing 20, a switch holder 22, a switch accommodating space (not shown) and a gripper 28. The switch holder 22 supports a switch module (not shown). The switch module can be, for example, a micro switch of the mouse. Different types of micro switches decide the sensitivity of the mouse buttons, but they have various lifetimes. For example, one micro-switch can only be clicked 20 million times but another can be clicked 50 million times. The switch holder 22 and the switch module are accommodated in the switch accommodating space. When the switch module is supported by the switch holder 22 and the switch holder 22 and the switch module are accommodated in the switch accommodating space, the switch module is connected to the circuit board through a connector in the housing of the mouse. For example, the connector can be an elastic piece made of conductive materials, but it is not limited thereto.

In addition, the lower housing 20 has a gripper accommodating space 29. The gripper 28 is accommodated in the gripper accommodating space 29. A user can grab the gripper 28 manually from the gripper accommodating space 29. Then he can use the gripper 28 to unload the switch module and the switch holder 22 for exchanging the switch module.

The advantage of the mouse provided by this embodiment is that, the user can grab the gripper 28 from the gripper accommodating space 29 with his bare hands, and then use the gripper 28 to easily unload the switch module and the switch holder 22 for exchanging the switch module. As shown in FIG. 1B, the lower housing 20 of the mouse has a slot (not shown in FIG. 1B), and the shape of the slot corresponds to the shape of the bottom of the switch holder 22. When there is no need to exchange the switch module for the mouse, the switch holder 22 is put into the slot to be accommodated by the switch accommodating space. In order to prevent the switch holder 22 from dropping, the switch holder 22 is locked in the switch accommodating space at the lower housing 20 by using at least one screwing member 24. For example, the screwing member 24 can be a screw, but it is not limited thereto. Alternatively, the switch holder 22 can be fastened to the lower housing 20 by using at least one fastener (not shown in FIG. 1B).

FIGS. 2A~2D show how a switch module of the mouse is exchanged according to one embodiment of the present disclosure.

Figure 2A:
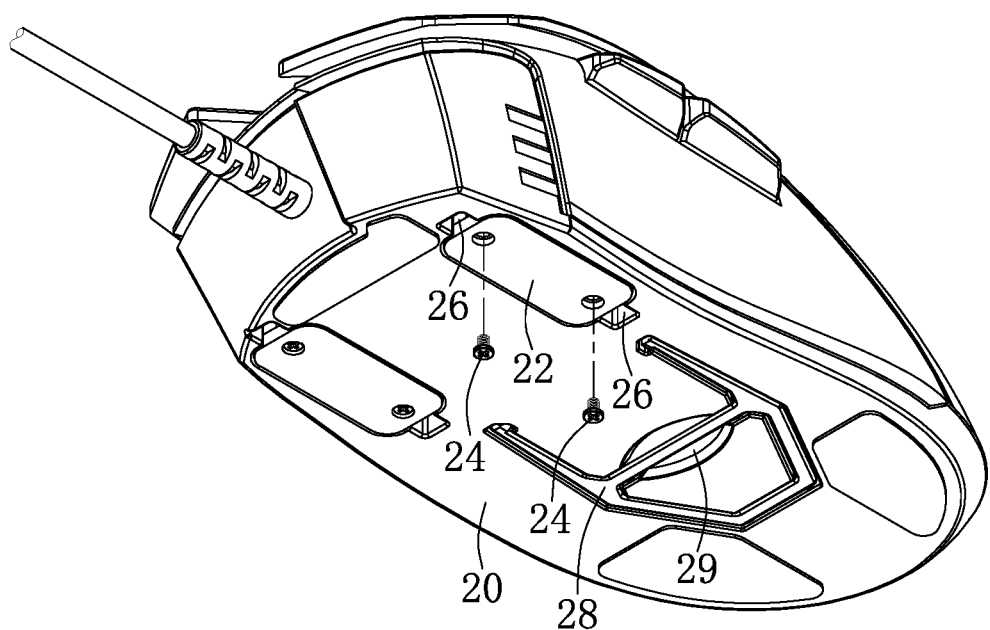
FIGS. 2A~2D are schematic diagrams showing how a switch module of the mouse is exchanged according to one embodiment of the present disclosure.
Figure 2B:
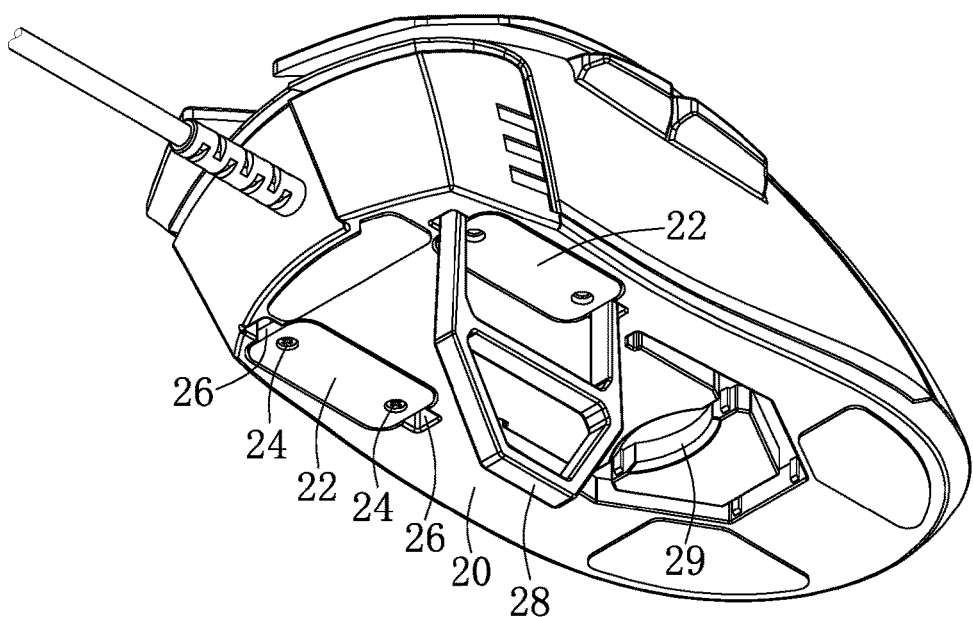

When a user tends to exchange a switch module for a mouse, as shown in FIG. 2A, he unloads a screwing member 24 for further taking off the switch holder 22 and the switch module. After that, the user can easily unload the switch holder 22 and the switch module by using the gripper 28 as shown in FIG. 2B.

Figure 2C:
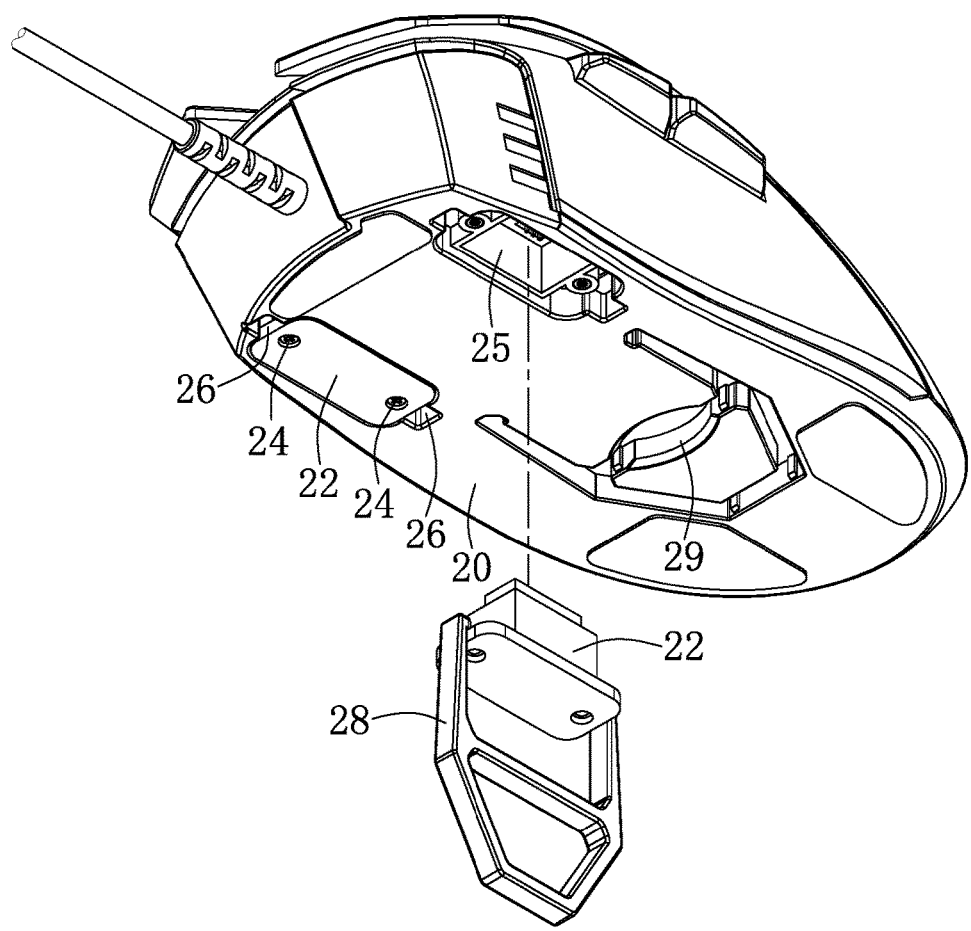
Figure 2D:
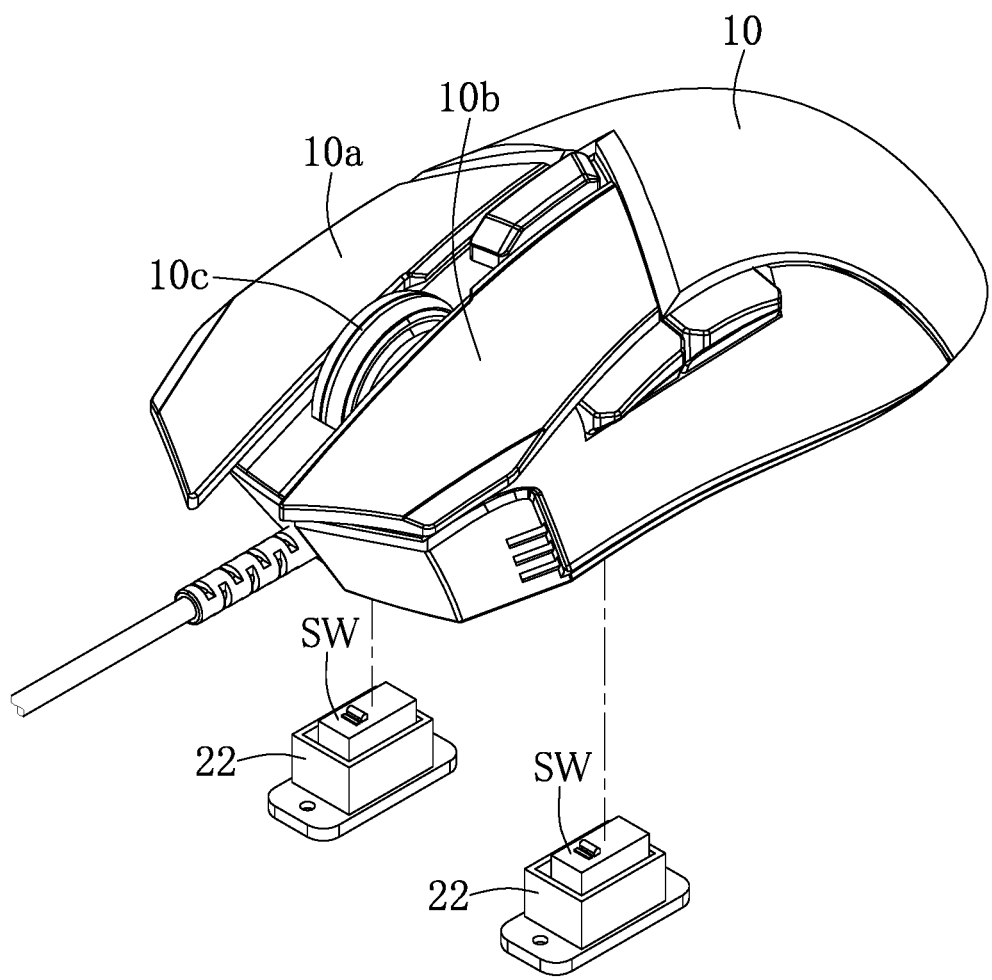
Figure 4A:
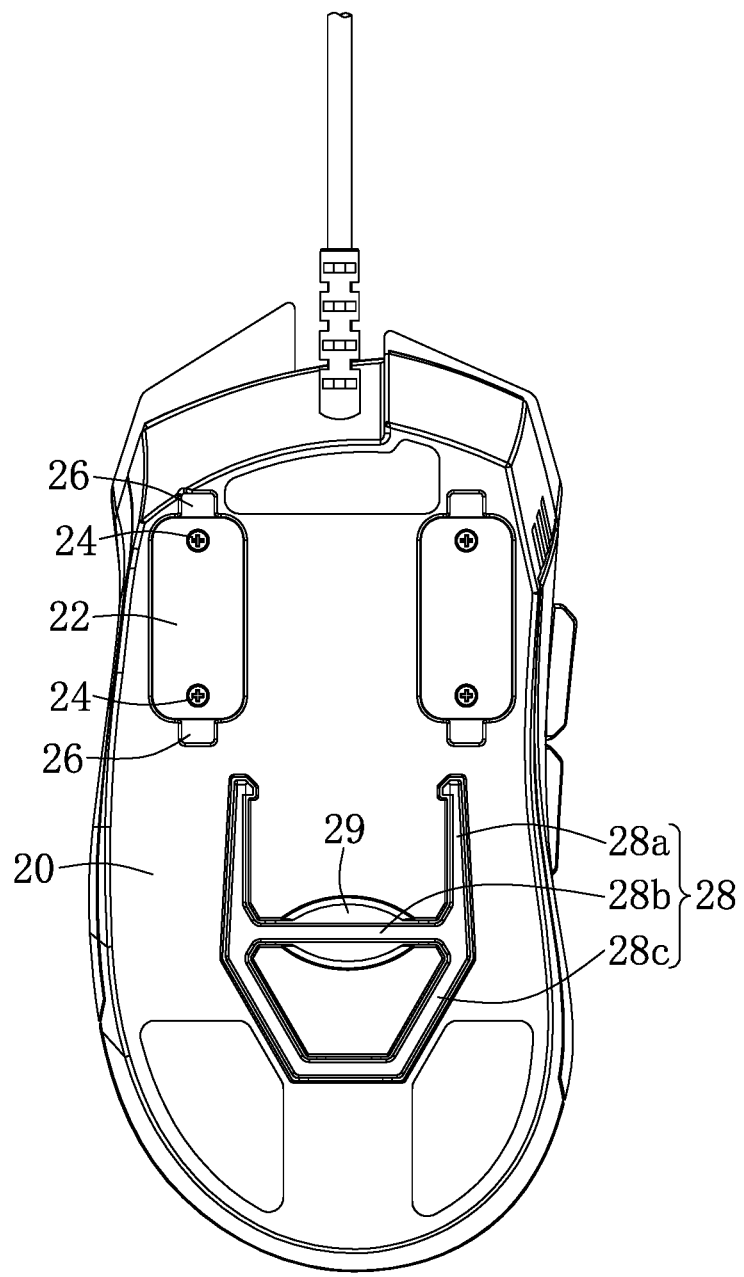
FIGS. 4A~4B show schematic diagrams of the bottom of a mouse according to one embodiment of the present disclosure.

FIG. 4A is a schematic diagram of the bottom of a mouse according to one embodiment of the present disclosure. As shown in FIG. 4A, the gripper 28 has a gripping end 28a and hand-held ends 28b and 28c. The gripping end 28a of the gripper 28 is clamp-shaped for taking off the switch holder 22. Additionally, the hand-held ends 28b and 28c of the gripper 28 are pull-ring-shaped so that the user can easily hold the gripper 28. However, the shape of the hand-held ends 28b and 28c of the gripper 28 are not restricted. In other words, the shape of the hand-held ends 28b and 28c of the gripper 28 can be any shape as long as it helps the user to easily hold the gripper 28. In FIG. 2B, two sides of the slot 25 of the lower housing 20 respectively have a through hole 26. After the screwing member 24 is unloaded, as shown in FIG. 2C and FIG. 2D, the user can make the gripping end 28a of the gripper 28 received by the through holes 26 and then make the gripping end 28a of the gripper 28 clamp two sides of the switch holder 22. In this manner, the user can easily unload the switch holder 22 and the switch module SW from the switch accommodating space for exchanging a new switch module SW or a better switch module SW.

FIGS. 3A~3D show two top views and two side views of a switch holder supporting a switch module according to one embodiment of the present disclosure. As shown in FIGS. 3A~3D, the switch module SW is supported by the switch holder 22.

Figure 4B:
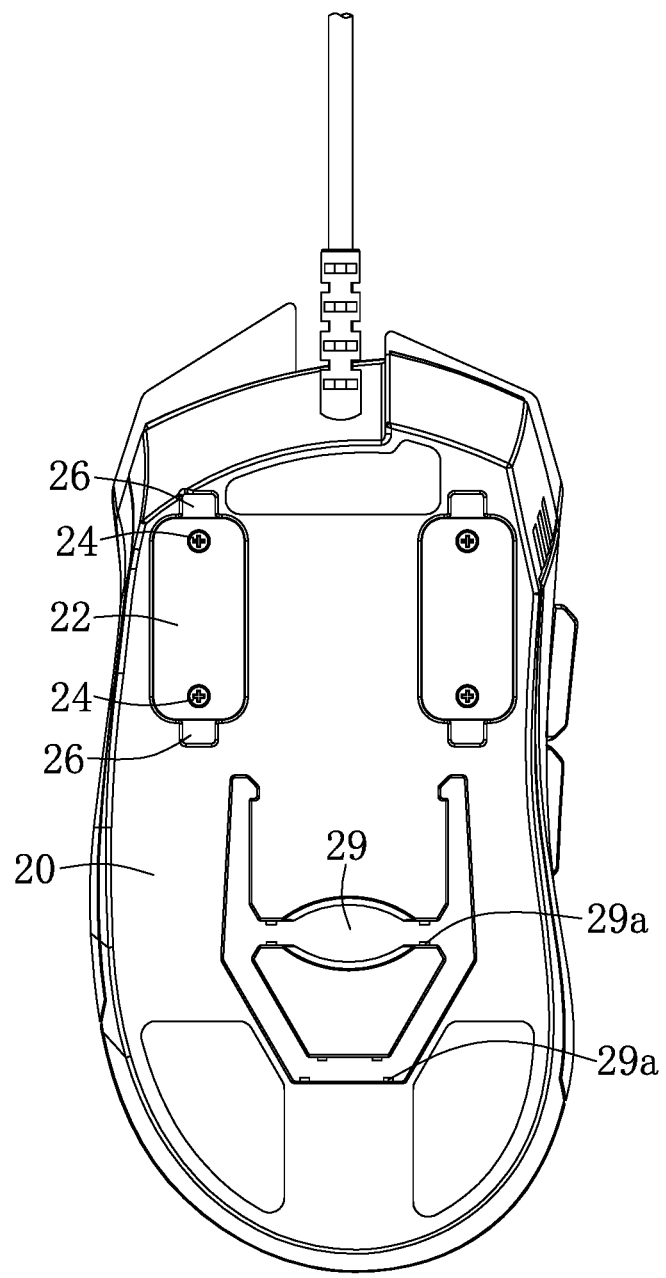

FIGS. 4A~4B show schematic diagrams of the bottom of a mouse according to one embodiment of the present disclosure. The gripper 28 may drop from the gripper accommodating space 29 of the lower housing 20, so the shape of the gripper accommodating space 29 is designed to be a slot of which the shape corresponds to the shape of the gripper 28. Particularly, a plurality of bumps 29a are mounted in the gripper accommodating space 29. These bumps 29a help to stick the gripper 28 in the gripper accommodating space so that the gripper 28 will not drop from the gripper accommodating space 29 when the mouse is displaced.

It is worth noticing that, regarding the gripper accommodating space 29, where to accommodate the hand-held ends 28b and 28c of the gripper 28 are designed as a slot. The shape of this slot is an oval so that it is convenient for the user to grab the gripper 28 from the gripper accommodating space 29. The user can put his finger in the slot and then easily pull the gripper 28 out of the gripper accommodating space 29.

Moreover, in another embodiment, the mouse further includes a sensor holder (not shown) and a sensor accommodating space (not shown). In this embodiment, the sensor holder is configured to support a sensor. Herein, the sensor can be, for example, an optical sensor or a laser sensor commonly used in a mouse; however, it is not limited thereto.

In this embodiment, the lower housing 20 of the mouse has another slot, and the shape of this slot corresponds to the shape of the bottom of the sensor holder. When there is no need to exchange the sensor, the sensor holder is put into the slot to be accommodated by the sensor accommodating space. In order to prevent the sensor holder from dropping, the sensor holder is locked in the sensor accommodating space at the lower housing 20 by using at least one screwing member. For example, the screwing member can be a screw, but it is not limited thereto.

Similar to the slot 25 at the lower housing 20 of the mouse, two sides of 25 this slot respectively have a through hole. When a user tends to exchange the sensor, the user can make the gripping end 28a of the gripper 28 received by the through holes and then make the gripping end 28a of the gripper 28 clamp two sides of the sensor holder. In this manner, the user can easily unload the sensor holder and the sensor from the sensor accommodating space for exchanging a new sensor.

To sum up, the design of the mouse provided by the present disclosure enables a user to easily exchange the micro switch of the mouse or other elements of the mouse. In short, the mouse provided by the present disclosure has the advantages as follows.

The shape of the gripper, the shape of the switch holder and the through holes at the lower housing are specially designed so that the user can easily unload the switch holder and the switch by using the gripper. In this manner, when the user tends to exchange the switch, a complex uploading process is no longer needed.

In addition, in the present disclosure, the gripper accommodating space is also specially designed so that the user can grab the gripper from the gripper accommodating space with his bare hands. Moreover, the bumps mounted in the gripper accommodating space help to stick the gripper in the gripper accommodating space so that the gripper will not drop from the gripper accommodating space when the mouse is displaced.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A mouse, comprising:
   a housing, having a button, at least one switch accommodating space and a gripper accommodating space;
   a circuit board, configured in the housing;
   at least one switch holder, supporting a switch module, wherein the switch module and the switch holder are accommodated within the switch accommodating space; and
   a gripper, accommodated within the gripper accommodating space of the housing, and used to unload the switch holder and the switch module for exchanging the switch module,
   wherein the gripper has a gripping end and a hand-held end, and the gripping end of the gripper is clamp-shaped;
   wherein the housing has a slot at the bottom of the housing, the shape of the slot corresponds to the shape of the bottom of the switch holder, and the switch holder is locked at the bottom of the housing by using at least one screwing member when the switch holder is put into the slot to be accommodated by the switch accommodating space;
   wherein two sides of the slot at the bottom of the housing respectively have a through hole, and when the screwing member is taken off, the gripping end of the gripper is received by the through holes and the gripping end of the gripper clamps the switch holder to unload the switch holder and the switch module.

2. The mouse according to claim 1, wherein a plurality of bumps are mounted in the gripper accommodating space.

3. The mouse according to claim 1, wherein when the switch holder is supporting the switch module, the switch module is connected to the circuit board through a connector.

4. The mouse according to claim 1, further comprising:
   a sensor holder, supporting a sensor; and
   a sensor accommodating space, accommodating the sensor and the sensor holder.

5. The mouse according to claim 4, wherein the housing has another slot at the bottom of the housing, the shape of the slot corresponds to the shape of the bottom of the sensor holder, and the sensor holder is locked at the bottom of the housing by using at least one screwing member when the sensor holder is put into the slot to be accommodated by the sensor accommodating space.

6. The mouse according to claim 5, wherein two sides of the slot at the bottom of the housing respectively have another through hole, and the gripping end of the gripper is received by the through holes and the gripping end of the gripper clamps the sensor holder to unload the sensor holder and the sensor.

7. The mouse according to claim 4, wherein when the sensor holder is supporting the sensor, the sensor is connected to the circuit board through another connector.

* * * * *